July 12, 1966 G. A. NEAL 3,259,985
VISUAL APPROACH GUIDANCE SYSTEM FOR LANDING AIRCRAFT
Filed April 18, 1962 2 Sheets-Sheet 1

$$TAN\ B = \frac{h-y}{\ell}$$

$$TAN\ C = \frac{h+y}{\ell}$$

$$TAN\ A = \frac{h}{\ell}$$

*Inventor*

GEORGE ARTHUR NEAL by: *Cavanagh & Norman.*

July 12, 1966  G. A. NEAL  3,259,985
VISUAL APPROACH GUIDANCE SYSTEM FOR LANDING AIRCRAFT
Filed April 18, 1962  2 Sheets-Sheet 2

Inventor
GEORGE ARTHUR NEAL
by: Cavanagh & Norman

United States Patent Office 3,259,985
Patented July 12, 1966

3,259,985
VISUAL APPROACH GUIDANCE SYSTEM FOR LANDING AIRCRAFT
George Arthur Neal, Downsview, Ontario, Canada, assignor to The de Havilland Aircraft of Canada Limited, Downsview, Ontario, Canada
Filed Apr. 18, 1962, Ser. No. 188,497
Claims priority, application Canada, Apr. 20, 1961, 821,660, Patent 652,322
7 Claims. (Cl. 33—46)

This invention relates to a visual approach guidance system for landing aircraft.

Of the variety of marker systems proposed to assist the pilot in ground approach methods to a landing strip, none are of a nature which can be placed in remote areas and of sufficiently simple form that little or no training is required for the use of same.

With the development and employment of various types of aircraft in particular for military aircraft in remote areas or in areas where emergency landing strips must be set up, the guidance of the aircraft to make a proper landing represents a serious problem in particular under conditions where pilots may change from one type of operational aircraft to another. Thus for example, a pilot for one period of time may be called upon to handle transport aircraft generally characterized by relatively steep glide angle. Within a following period or under emergency conditions the pilot may be required to handle a light personal type of aircraft for reconnaissance or emergency service which may have a much steeper angle of glide or even a lesser angle of glide than a transport aircraft depending upon the speed capabilities and other characteristics of the aircraft concerned. Again some pilots may be flying jet aircraft and be transferred to propeller driven aircraft. As a result, the pilot's familiarity with the flight characteristics of a given craft may render it difficult for him to fly a different kind of craft or one of similar kind but different characteristics on short notice.

There is accordingly a real need for a simple system for guiding the landing approach of an aircraft from which the glide path can be sighted for the particular aircraft flown and which is characterized by simple and portable structure which may be placed under emergency conditions on an emergency landing line of approach.

With the advent of the "short take off short landing" (S.T.O.L) type aircraft and the demand for short field operations, the landing of an aeroplane consistently at the beginning of the landing strip has become a problem. This is also true to some extent for newer designs of jet transports for which runway lengths are limited.

In order to accomplish a short run landing, a pilot must be able to satisfy three fundamental conditions. First, he must be able to control the airspeed with a high degree of accuracy. Secondly, he must be able to maintain the aircraft on a constant path of approach, that is to say, he must set the correct angle of approach to the air strip or runway and be able to maintain it. Thirdly, the pilot must start his flare for the landing at precisely the right height above the ground at the correct point in the flight path in relation to the beginning of the runway.

In order to determine the short take off short landing characteristics of an aeroplane, one must begin with the designed landing characteristics of the aircraft, as for example assume the particular aircraft is designed to land in a distance of 1000 feet over a 50 foot obstacle in still air. In order to determine the "short take off short landing" performance, the aeroplane is loaded at its maximum gross weight and usually at the forward centre of gravity to impose the most adverse conditions. On the approach, the aircraft is set up with full flap, landing gear down and engines idling. The aircraft is then motored into position off the end of the runway where a full glide approach can be accomplished so that the aircraft comes into camera range at an elevation of 50 feet and stops its landing roll before going out of camera range. Using an airspeed of 1.3 stalling speed initially, landings are carried out with successively decreasing speed down to a point where the aircraft has just sufficient speed to allow for a complete flare with no floating. The low limit of approach speed will usually be found to be within about 1.11 to 1.15 of stalling speed. Once the limiting approach speed has been determined, further landings are carried out to check repeatability consistency to determine an average landing distance from a point of 50 feet elevation on a flight path. The distance from the 50 feet elevation point is computed from the photographs obtained and becomes the published "short take off short landing" distance for the aircraft for zero wind on a standard day.

The landing technique is then developed by moving to a short landing strip of say 1000 feet with an aircraft for which the above determined short landing distance may be of the order of 450 feet. Under these conditions, the aircraft must touch down within the first 100 feet from the 50 feet elevation point and must be travelling at no more than stall speed when touching down. Braking must be used promptly and at its maximum from the beginning of the landing run.

Assuming the pilot under the conditions mentioned approaches the runway at 5 miles per hour faster than 1.15 stalling speed and that he begins his flare or round out at the 50 feet elevation point, the increased air speed will cause him to float approximately 200 feet further along the runway before he touches down. With maximum braking beginning at stall speed on the runway, the aircraft will require the full 450 feet to come to a full stop. Taking into account the first 100 feet of the precise touch down point and the additional 200 feet due to excessive air speed, it will be apparent that the pilot will have less than 250 feet margin left on the 1000 feet strip. A slight relaxing on the brakes too soon will allow the landing run to overshoot. If the pilot approaches on a slightly high approach path, he will definitely overshoot the end of the runway. While these considerations apply to zero wind conditions, it is to be noted that even with a 10 miles per hour wind, the aeroplane must be landed within the first 300 feet of the air strip. Accordingly there is a need for an approach guidance system for landing aircraft according to "short take off short landing" techniques. The invention provides a visual approach guidance system as will hereinafter be disclosed in more detail.

It is accordingly the main object of this invention to provide a visual approach guidance system for landing aircraft on a selected landing strip and which is adaptable for use by a variety of aircraft and especially those of steep glide or approach angle on short landing strips.

Other objects of the invention will be apparent from a study of the following specification taken into conjunction with the accompanying drawings.

According to this invention, a 50 foot obstacle may be placed a predetermined distance back from the strip so that for the short landing angle of approach for the particular aircraft, the pilot will be able to come as close as possible to the obstacle with his air speed and power setting correct thus to achieve an approach which will place him at a touch down point 100 feet within the runway. Power setting is important because it is not possible to do a "power off" approach and arrive over the obstacle at right air speed and glide path so as to hit the correct touch down point of the runway consistently. Therefore, power is used to make allowance for head wind or gust conditions and to maintain a constant glide angle to the point of touch down.

One of the greatest difficulties for the pilot undertaking a steep approach short landing is the determination of the precise point to being his flare. The steeper the approach the more difficult it is to judge the height above the ground. In this kind of technique, one is approaching the landing strip at descent rates in excess of 500 feet per minute. Relative speed over the ground does aid the pilot in height judgment. However, when a steep approach is made into a strong head wind, the forward speed over the ground is very low causing the pilot in most cases to start his flare too soon. With heavily flapped aeroplanes, an approach close to stalling speed can be hazardous since the deceleration may be quite rapid with a small change of approach angle. This invention is therefore concerned with a system giving the pilot a readily understandable means of visually assisting him in positioning his aeroplane correctly for a "short take off short landing" type of landing.

The system disclosed herein is adapted for use with a variety of aircraft having different short landing angles of approach determined in the manner set forth in the introductory part of this specification. The system as disclosed herein may be set up for an in-line sight angle approach of 4.5°. The same system and the same apparatus arrangement may be utilized for a high angle of approach of 6° and also for a low angle of approach of 3°. It is, therefore, contemplated according to the instant invention that the system herein may be used in assisting the landing of a relatively wide range of aircraft types with which "short take off short landing" techniques may be practiced.

Figure 1:
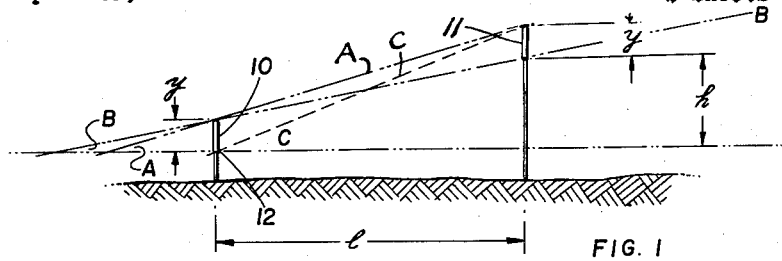
FIGURE 1 is a diagrammatic illustration of the system of the invention as applied to three aircraft having different glide angles or angles of approach and revealing the structural elements of the system as applied to the guidance of such aircraft.
Figure 4:
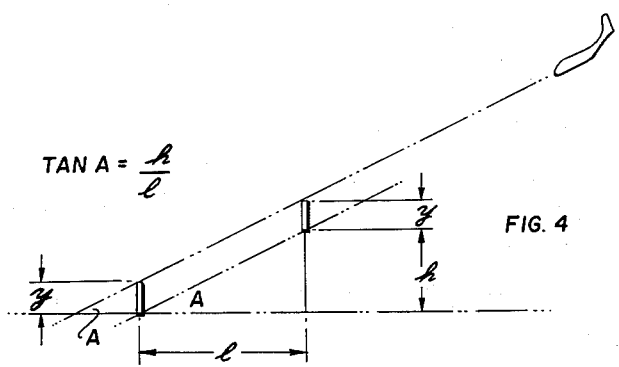
FIGURE 4 represents the geometric condition of an in line sight line with the system of FIGURE 1 for an aircraft having an intermediate angle of approach A.

Thus, referring to FIGURE 1, the system of the invention is illustrated in diagrammatic form wherein a target 10 of height "y" is set at a distance "l" from a sight 11 of height "y" positioned at an elevation "h" above the base line 12 of target 10. Assuming a flight path A, the sight 11 for an aircraft approaching on the path A will appear exactly to obscure the target 10. The pilot on the approach A may then visually determine when his aircraft is on the flight path A. The geometry for the flight path A is revealed in FIGURE 4 wherein it will be apparent that the relation $$\tan A = \frac{h}{l}$$

applies.

Figure 2:
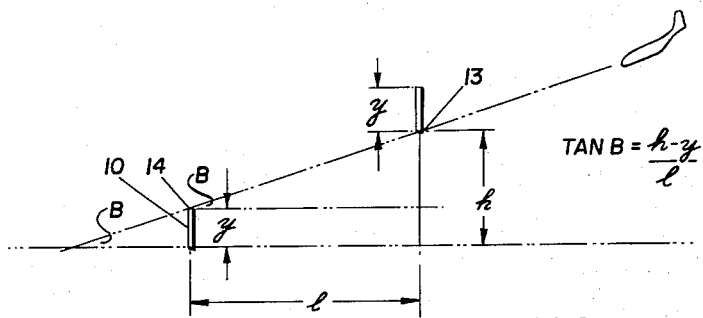
FIGURE 2 represents a geometric condition of a low sight line of approach with the approach system of the invention shown in FIGURE 1 for the low angle approach path B.

The low angle of approach is represented by the path B also shown in FIGURE 2 wherein the pilot may place the bottom edge 13 of the sight in line with the top edge 14 of the target 10. Under these conditions $$\tan B = \frac{h-y}{l}$$

For a high angle of approach along the flight path C, the pilot may align the upper edge 15 of the sight 11 on the lower edge 12 of the target 10 and the relationship $$\tan C = \frac{h+y}{l}$$

will hold.

Figure 3:
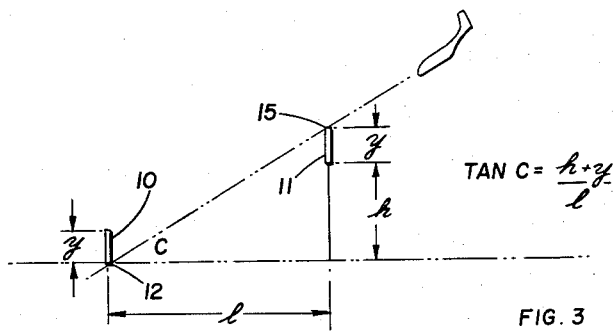
FIGURE 3 represents a geometric condition of high angle approach with the system of FIGURE 1 on the high angle approach path C.

By way of example assuming that the distance "l" is 75 feet, and that the dimension "y" is 2 feet, and setting the angle A at 4.5°, solving from the relation for the angle A it will be found that the value of "h" will be 5.9 feet. Solving for the angle B, the low approach angle will be found to be 2.98° or say 3°. Again solving for the angle C from the relation shown in FIGURE 3, the high angle of approach C will be found to be 6°.

Figure 5:
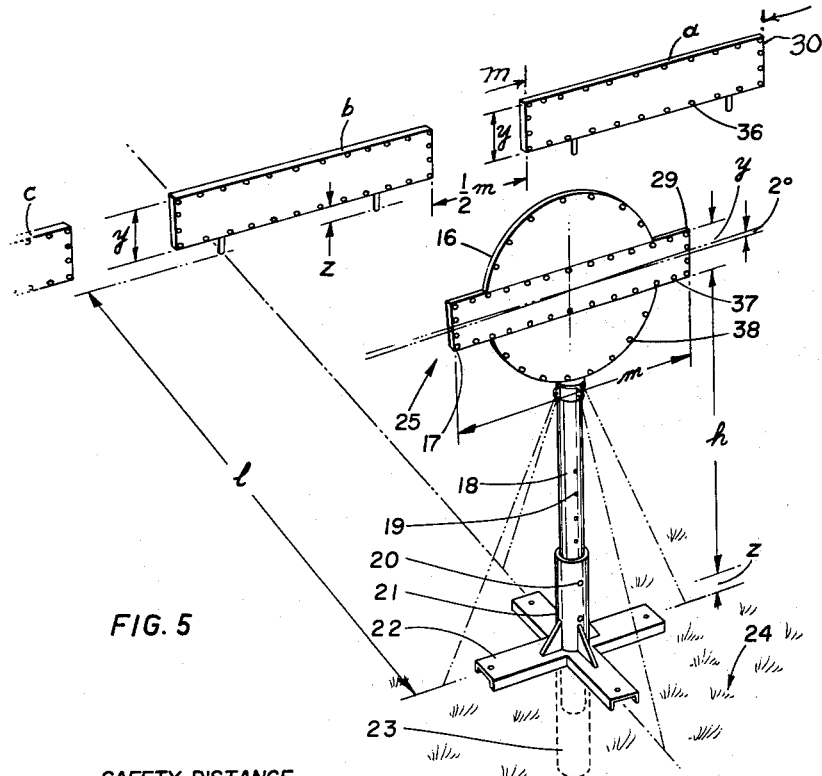
FIGURE 5 is a perspective view of a suitable structural arrangement of the system of FIGURE 1; and, FIGURE 6 is a plan view of an air strip illustrating the application of the apparatus of FIGURE 5 thereto.
Figure 6:
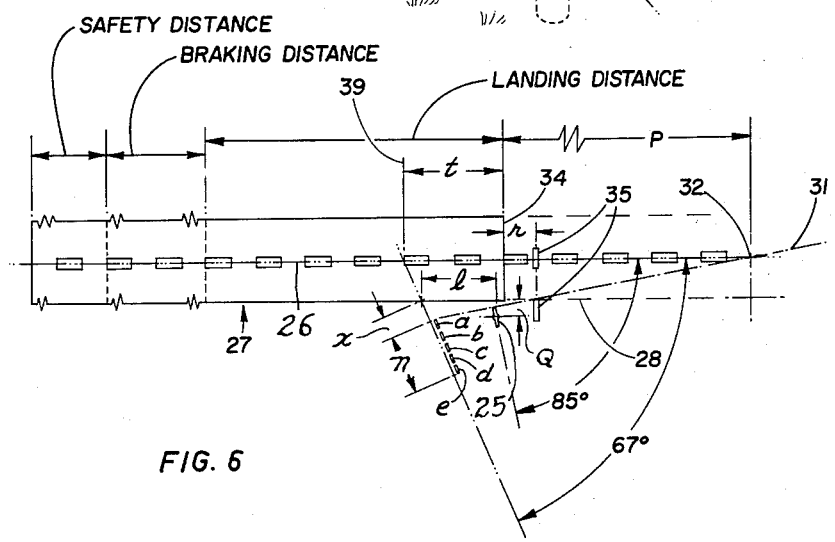

The structural form of the system is revealed in FIGURES 5 and 6. In FIGURE 5, the sighting device is preferably provided in the form of an 8 foot diameter disc 16 embodying the transversely extending member 17 of a height or depth "y" equal preferably to 2 feet and of approximately 10 feet in width. Disc 16 is supported by the rigid tube 18 having height adjusting holes 19 therein adapted to accommodate a pin 20 in socket 21 rigidly fastened to base 22 embodying a downwardly projecting tubular portion 23 of socket 21 adapted to extend into the ground supporting surface 24. As shown in FIGURE 6 of the sighting device generally designated by numeral 25 is disposed at an angle of preferably 85° with respect to the centre line 26 of the runway 27 and spaced preferably a distance "q" equal to about 16 feet from the left hand edge 28 of the runway. Additionally, the sighting member 17 is tilted at an angle of 2° to allow for the angle of the sight relative to the centre line of the runway.

A series of targets of a length "m" equal to the length "m" of the sight 17 and of a similar depth or height "y" are spaced apart a distance of ½ "m" in series array as illustrated in FIGURE 6 at an angle to the centre line of the runway of approximately 67° and at a distance "l" measured along the runway equal to 75 feet. In FIGURE 6 the dimension "x" may suitably be 23½ feet and "n" 70 feet whereby the right edge 29 of sight 25 aligned with the right hand edge 30 of target "a" will describe a line 31 intersecting the centre line of the runway at the point 32 being a distance for the present example "p"=537 feet from the "button" or edge 34 of the runway 27.

It will be apparent that as the pilot proceeds on the approach flight path from point 32, the right hand edge 29 of sight 17 will appear to move to the left consecutively over target a, b, c, and d and e. As the sight appears to overlie the last target "e," ground markers 35 spaced a distance "r" from the runway end or "button" 34 equal say 20 feet in the present example, will indicate to the pilot the point of flare at which he will cut the engine to idling speed.

In order to assist in sighting, the disc 16 is coloured a fluorescent green and the targets "a" to "e" a fluorescent red. The slight bar 17 is preferably coloured a dull black. For night operation, each of the targets embodies a series of outlining lights 36 preferably in bright red. The sight bar 17 embodies an outlining series of lights 37 preferably yellow, whereas the disc embodies an outlining series of lights 38 preferably green in colour.

With the system described the pilot approaches the runway holding the airspeed constant and keeping the red targets in the centre of the green disc. Assuming his aircraft has a short landing angle of approach equal to the in-line sight angle A, if the target red appears above the top edge of the sight bar 17 or above the green disc, he knows his approach angle is too steep and he will therefore ease off his power in order to allow the aircraft to descend a little faster until the red target appears to be occluded by the sight bar. He then applies enough power to keep the aircraft on this angle of approach. If the pilot observes that the red target is showing below the sight bar or the green disc he applies more power to come up to the correct glide slope or angle of approach at which the sight bar occludes the red target. Providing the pilot keeps the sight bar lined up with the red target, he will be brought into the touch down point 39 at a distance "*t*" from the starting edge 34 or button of the runway 27.

The next problem for the pilot is to start the flare out at the right point. The markers 35 placed at a distance "*r*" from the button of the runway give him sufficient visual aid providing his air speed is constant to determine the point at which he cuts power and flares out without danger of being too high or too low. Thus the pilot is enabled consistently to touch down on the beginning of the runway and to stop with plenty of room to spare. The invention can also be used as an aid to ordinary landing methods for the average aeroplane for a normal approach angle of about 3°.

The present invention has proved in use to be a desirable training aid for pilots converting over to "short take off short landing" type aircraft for such take off and landing techniques practiced with aircraft not specifically designed for such purpose. The system allows the pilot to become familiar with steep approach and short landings with the minimum of instruction, explanation and practice. Ordinarily the visual landing aid of the invention can be detected by the pilot approaching on the base leg of the run-in to the landing strip and the setting of the approach for the run-in can be started on the visual aid of the invention from this point on in. This feature makes it easier for the pilot under poor weather conditions where short circuits to the run-in may be necessary.

The invention enables various types of aircraft to be landed with safety on a minimum landing strip length. By virtue of its simplicity of construction and set-up, the landing system herein is especially adaptable to bringing aircraft into emergency landing areas in forward areas of operation on short notice. The invention also enables the pilot to change aircraft even from one type to another with sufficient information to guide him into a short and safe landing.

It is intended that the present disclosure of this invention should not be construed in any limiting sense other than that indicated by the scope of the following claims having regard to the state of the art.

What I claim is:

1. A visual approach guidance system for landing aircraft on an air strip having a predetermined touch down point thereon and comprising: a plurality of target means to one side of said air strip located substantially beside said touch down point and of a predetermined height $y$ between upper and lower edges thereof; and a sighting member of a height between upper and lower edges thereof substantially equal to the said height dimension $y$ and positioned beside said air strip a distance $l$ in advance of said target means and a height $h$ above the lower margin of said target means to define a line of sight when said sighting means appears to the eye to cover said target means of an angle A defining an approach angle for an aircraft approaching said air strip, the upper edge of said sighting means being adapted to be sighted on the lower edge of said target means thereby to define a high angle of approach described by the relation $$\tan C = \frac{h+y}{l}$$

where C is the high angle of approach.

2. A visual approach guidance system for landing aircraft on an air strip having a predetermined touch down point thereon and comprising: a plurality of target means to one side of said air strip located substantially beside said touch down point and of a predetermined height $y$ between upper and lower edges thereof; and sighting means of a height between upper and lower edges thereof substantially equal to the said height dimension $y$ and positioned beside said air strip a distance $l$ in advance of said target means and a height $h$ above the lower margin of said target means to define a line of sight when said sighting means appears to the eye to cover said target means of an angle A defining an approach angle for an aircraft approaching said air strip, the upper edge of said sighting means being adapted to be sighted on the lower edge of said target means thereby to define a high angle of approach described by the relation $$\tan C = \frac{h+y}{l}$$

where C is the high angle of approach, the lower edge of said sighting means being adapted to be sighted on the upper edge of said target means to define a low approach angle B according to the relation $$\tan B = \frac{h-y}{l}$$

3. A visual approach guidance system for landing aircraft on an air strip having a predetermined touch down point thereon and comprising: a plurality of target means to one side of said air strip located substantially beside said touch down point and of a predetermined height $y$ between upper and lower edges thereof; and sighting means of a height between upper and lower edges thereof substantially equal to the said height dimension $y$ and positioned beside said air strip a distance $l$ in advance of said target means and a height $h$ above the lower margin of said target means to define a line of sight when said sighting means appears to the eye to cover said target means of an angle A defining an approach angle for an aircraft approaching said air strip, the upper edge of said sighting means being adapted to be sighted on the lower edge of said target means thereby to define a high angle of approach, and adapted to be utilized for there different angles of approach wherein the low angle of approach C is defined by the relation $$\tan C = \frac{h+y}{l}$$

the intermediate angle of approach A corresponding to in-line sighting of said sighting means on said target means is defined by the relation of $$\tan A = \frac{h}{l}$$

and wherein the low angle of approach $$\tan B = \frac{h-y}{l}$$

4. A visual approach guidance system for landing aircraft on an air strip having a predetermined touch down point thereon and comprising: a plurality of target means to one side of said air strip located substantially beside said touch down point and of a predetermined height $y$ between upper and lower edges thereof; and sighting means of a height between upper and lower edges thereof substantially equal to the said height dimension $y$ and positioned beside said air strip a distance $l$ in advance of said target means and a height $h$ above the lower margin of said target means to define a line of sight when said sighting means appears to the eye to cover said target means of an angle A defining an approach angle for an aircraft approaching said air strip, the upper edge of said sighting means being adapted to be sighed on the lower edge of said target means thereby to define a high angle of approach described by the relation $$\tan C = \frac{h+y}{l}$$

where C is the high angle of approach, and adapted to be utilized for three different angles of approach wherein the low angle of approach C is defined by the relation $$C = \frac{h+y}{l}$$

the intermediate angle of approach A corresponding to in-line sighting of said sighting means on said target means is defined by the relation of $$\tan A = \frac{h}{l}$$

and wherein the low angle of approach $$\tan B = \frac{h-y}{l}$$

and wherein the values of $l$, $h$ and $y$ are set to provide an angle $A = 4\frac{1}{2}°$, $B = 3°$ and $C = 6°$.

5. The system claimed in claim 4 in which said sighting means embodies a disc portion and said target means and said disc portion are coloured in contrasting colours.

6. The system claimed in claim 4 and a flare marker located in advance of said air strip to indicate to the pilot the point at which a flare out should be initiated to touch down at said predetermined touch down point.

7. The system as claimed in claim 4 including means for adjusting the height of said sighting member.

References Cited by the Examiner
UNITED STATES PATENTS

| | | | |
|---|---|---|---|
| 1,349,277 | 8/1920 | Honig | 33—46 |
| 2,221,606 | 11/1940 | Piacentini | 40—217 |
| 2,280,126 | 4/1942 | Metcalf | 340—26 X |
| 2,946,041 | 7/1960 | Kamborian | 340—26 X |
| 2,991,743 | 7/1961 | Ogle | 340—26 X |

LOUIS R. PRINCE, *Primary Examiner.*

ROBERT B. HULL, *Examiner.*